(12) United States Patent
Osborn et al.

(10) Patent No.: US 12,086,852 B2
(45) Date of Patent: Sep. 10, 2024

(54) AUTHENTICATING VOICE TRANSACTIONS WITH PAYMENT CARD

(71) Applicant: Capital One Services, LLC, McLean, VA (US)

(72) Inventors: Kevin Osborn, Newton, MA (US); Jeffrey Rule, Chevy Chase, MD (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/504,987

(22) Filed: Jul. 8, 2019

(65) Prior Publication Data

US 2021/0012401 A1  Jan. 14, 2021

(51) Int. Cl.
 *G06Q 30/0601* (2023.01)
 *G06F 3/16* (2006.01)
 (Continued)

(52) U.S. Cl.
 CPC ......... *G06Q 30/0613* (2013.01); *G06F 3/167* (2013.01); *G06Q 20/12* (2013.01);
 (Continued)

(58) Field of Classification Search
 CPC .. G06Q 20/12; G06Q 20/352; G06Q 20/3829; G06Q 20/40; G06Q 30/0613;
 (Continued)

(56) References Cited

U.S. PATENT DOCUMENTS

| 4,683,553 A | 7/1987 | Mollier |
| 4,827,113 A | 5/1989 | Rikuna |

(Continued)

FOREIGN PATENT DOCUMENTS

| CA | 3010336 A1 | 7/2017 |
| CN | 101192295 A | 6/2008 |

(Continued)

OTHER PUBLICATIONS

Batina, L. and Poll, E., "SmartCards and RFID", Course PowerPoint Presentation for IPA Security Course, Digital Security at University of Nijmegen, Netherlands (date unknown) 75 pages.

(Continued)

*Primary Examiner* — Courtney P Jones
(74) *Attorney, Agent, or Firm* — KDW FIRM PLLC

(57) ABSTRACT

Disclosed are a system and techniques for authenticating voice transactions with a payment card. A system example may include a purchase application executing on a smart digital device, and a payment card. The purchase application may receive an item purchase request via an audio input device of the smart digital device for an item available to purchase. The received item purchase request may be sent to an application server or the like, and, in response, a list of merchants offering the item available for purchase and each merchant's price for the item available to purchase may be received. The list may be presented on a smart digital device display for selection of at least one of the merchants selling the item may be received. A payment card may be inserted into the smart digital device's near-field communication field to provide a signal containing encrypted data.

14 Claims, 6 Drawing Sheets

(51) Int. Cl.
 *G06Q 20/12* (2012.01)
 *G06Q 20/34* (2012.01)
 *G06Q 20/38* (2012.01)
 *G06Q 20/40* (2012.01)
 *H04W 4/80* (2018.01)

(52) U.S. Cl.
 CPC ....... *G06Q 20/352* (2013.01); *G06Q 20/3829* (2013.01); *G06Q 20/40* (2013.01); *G06Q 30/0605* (2013.01); *G06Q 30/0625* (2013.01); *G06Q 30/0641* (2013.01); *H04W 4/80* (2018.02); *G06Q 2220/00* (2013.01)

(58) Field of Classification Search
 CPC ........... G06Q 30/0605; G06Q 30/0625; G06Q 30/0641; H04W 4/80; G06F 3/167
 USPC ........................................................ 705/71
 See application file for complete search history.

(56) References Cited

U.S. PATENT DOCUMENTS

| | | |
|---|---|---|
| 4,910,773 A | 3/1990 | Hazard et al. |
| 5,036,461 A | 7/1991 | Elliott et al. |
| 5,363,448 A | 11/1994 | Koopman, Jr. et al. |
| 5,377,270 A | 12/1994 | Koopman, Jr. et al. |
| 5,533,126 A | 7/1996 | Hazard |
| 5,537,314 A | 7/1996 | Kanter |
| 5,592,553 A | 1/1997 | Guski et al. |
| 5,616,901 A | 4/1997 | Crandall |
| 5,666,415 A | 9/1997 | Kaufman |
| 5,763,373 A | 6/1998 | Robinson et al. |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Kaminkow |
| 8,005,426 B2 | 8/2011 | Huomo et al. |
| 8,010,405 B1 | 8/2011 | Bortolin et al. |
| RE42,762 E | 9/2011 | Shin et al. |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |

(56) References Cited

U.S. PATENT DOCUMENTS

| | | |
|---|---|---|
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,559,872 B2 | 10/2013 | Butler |
| 8,566,916 B1 | 10/2013 | Bailey et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | de Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | Von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,880,027 B1 | 11/2014 | Darringer |
| 8,888,002 B2 | 11/2014 | Marshall Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,280 B2 | 9/2015 | Bona et al. |
| 9,152,832 B2 | 10/2015 | Royston et al. |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,306,626 B2 | 4/2016 | Hall et al. |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,953,323 B2 | 4/2018 | Candelore et al. |
| 9,961,194 B1 | 5/2018 | Wiechman et al. |
| 9,965,756 B2 | 5/2018 | Davis et al. |
| 9,965,911 B2 | 5/2018 | Wishne |
| 9,978,058 B2 | 5/2018 | Wurmfeld et al. |
| 10,043,164 B2 | 8/2018 | Dogin et al. |
| 10,075,437 B1 | 9/2018 | Costigan et al. |
| 10,129,648 B1 | 11/2018 | Hernandez et al. |
| 10,133,979 B1 | 11/2018 | Eidam et al. |
| 10,217,105 B1 | 2/2019 | Sangi et al. |
| 10,475,014 B1* | 11/2019 | Ramalingam ........ G06Q 20/206 |
| 11,037,139 B1* | 6/2021 | Ho ..................... G06Q 20/3263 |
| 11,341,470 B1* | 5/2022 | Pearce ............... G06Q 20/4018 |
| 11,372,958 B1* | 6/2022 | Clowe .................... G06F 21/33 |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0247797 A1 | 11/2005 | Ramachandran |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |

(56) References Cited

U.S. PATENT DOCUMENTS

| | | |
|---|---|---|
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0086767 A1 | 4/2008 | Kulkarni et al. |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0281890 A1* | 11/2009 | Aliabadi ............ G06Q 30/0283 705/14.34 |
| 2009/0282264 A1 | 11/2009 | Ameil et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0299225 A1* | 11/2010 | Aarni ................ G06Q 30/0603 705/27.2 |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadarajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0184834 A1* | 7/2011 | Perrochon ............ G06Q 30/0633 705/26.8 |
| 2011/0208658 A1 | 8/2011 | Makhotin |
| 2011/0208965 A1 | 8/2011 | Machani |
| 2011/0211219 A1 | 9/2011 | Bradley et al. |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143754 A1 | 6/2012 | Patel |
| 2012/0150737 A1 | 6/2012 | Rottink et al. |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0013499 A1 | 1/2013 | Kalgi |
| 2013/0026229 A1 | 1/2013 | Jarman et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou et al. |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0216108 A1 | 8/2013 | Hwang et al. |
| 2013/0221092 A1* | 8/2013 | Kushevsky .......... G06Q 20/327 235/379 |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0312远 A1 | 11/2013 | Zu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |

(56) References Cited

U.S. PATENT DOCUMENTS

| | | |
|---|---|---|
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0138435 A1* | 5/2014 | Khalid ............... G06Q 20/352 235/380 |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0088757 A1 | 3/2015 | Zhou et al. |
| 2015/0089586 A1 | 3/2015 | Ballesteros |
| 2015/0134452 A1 | 5/2015 | Williams |
| 2015/0140960 A1 | 5/2015 | Powell et al. |
| 2015/0154595 A1* | 6/2015 | Collinge ............. H04L 63/0428 705/71 |
| 2015/0170138 A1 | 6/2015 | Rao |
| 2015/0178724 A1 | 6/2015 | Ngo et al. |
| 2015/0186871 A1 | 7/2015 | Laracey |
| 2015/0186973 A1* | 7/2015 | Athimoolam ...... G06Q 30/0625 705/26.62 |
| 2015/0205379 A1 | 7/2015 | Mag et al. |
| 2015/0302409 A1 | 10/2015 | Malek et al. |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1* | 12/2015 | Huang ............. G06Q 20/40975 705/44 |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0226837 A1* | 8/2016 | Kim .................... H04L 9/3234 |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0275492 A1* | 9/2016 | Brickell ............. G06Q 20/3674 |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0308862 A1* | 10/2016 | Rolfe .................. H04L 9/3228 |
| 2016/0314472 A1 | 10/2016 | Ashfield |
| 2016/0330027 A1 | 11/2016 | Ebrahimi |
| 2016/0335531 A1* | 11/2016 | Mullen ............... G06Q 20/357 |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0076357 A1* | 3/2017 | Peddinti ............ G06Q 30/0275 |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0116596 A1* | 4/2017 | Tsui ................... G06Q 20/353 |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0193591 A1* | 7/2017 | Narasimhan ....... G06Q 30/0641 |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0068316 A1 | 3/2018 | Essebag et al. |
| 2018/0091193 A1* | 3/2018 | Hagedorn ............ H04B 5/0056 |
| 2018/0129945 A1 | 5/2018 | Saxena et al. |
| 2018/0160255 A1 | 6/2018 | Park |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0261223 A1* | 9/2018 | Jain ...................... G06F 40/35 |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0351929 A1* | 12/2018 | Kohli .................. G06Q 20/363 |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0043039 A1* | 2/2019 | Wilson ................ G06Q 20/355 |
| 2019/0102764 A1* | 4/2019 | Pattarawuttiwong ....................... G06Q 20/085 |
| 2019/0180343 A1* | 6/2019 | Arnett ................... G06F 16/951 |
| 2019/0188705 A1* | 6/2019 | Ecker .................... G06Q 20/40 |
| 2019/0197182 A1* | 6/2019 | Yeh .................. G06Q 30/0625 |
| 2019/0238517 A1 | 8/2019 | D'Agostino et al. |
| 2020/0175154 A1* | 6/2020 | Ratnakaram ............ G06F 21/32 |
| 2020/0294043 A1* | 9/2020 | Clarke .................. G06Q 30/02 |

FOREIGN PATENT DOCUMENTS

| | | |
|---|---|---|
| CN | 103023643 A | 4/2013 |
| CN | 103417202 A | 12/2013 |
| EP | 1085424 A1 | 3/2001 |
| EP | 1223565 A1 | 7/2002 |
| EP | 1265186 A2 | 12/2002 |
| EP | 1783919 A1 | 5/2007 |
| EP | 2139196 A1 | 12/2009 |
| EP | 1469419 A1 | 8/2012 |
| EP | 2852070 A1 | 3/2015 |
| GB | 2457221 A | 8/2009 |
| GB | 2516861 A | 2/2015 |
| GB | 2551907 A | 1/2018 |
| JP | 2019191716 A | 10/2019 |

(56) References Cited

FOREIGN PATENT DOCUMENTS

| | | |
|---|---|---|
| KR | 101508320 B1 | 4/2015 |
| WO | 0049586 A1 | 8/2000 |
| WO | 2006070189 A2 | 7/2006 |
| WO | 2008055170 A2 | 5/2008 |
| WO | 2009025605 A2 | 2/2009 |
| WO | 2010049252 A1 | 5/2010 |
| WO | 2011112158 A1 | 9/2011 |
| WO | 2012001624 A1 | 1/2012 |
| WO | 2013039395 A1 | 3/2013 |
| WO | 2013155562 A1 | 10/2013 |
| WO | 2013192358 A2 | 12/2013 |
| WO | 2014043278 A1 | 3/2014 |
| WO | 2014170741 A2 | 10/2014 |
| WO | 2015179649 A1 | 11/2015 |
| WO | 2015183818 A1 | 12/2015 |
| WO | 2016097718 A1 | 6/2016 |
| WO | 2016160816 A1 | 10/2016 |
| WO | 2016168394 A1 | 10/2016 |
| WO | 2017042375 A1 | 3/2017 |
| WO | 2017042400 A1 | 3/2017 |
| WO | 2017157859 A1 | 9/2017 |
| WO | 2017208063 A1 | 12/2017 |
| WO | 2018063809 A1 | 4/2018 |
| WO | 2018137888 A1 | 8/2018 |
| WO | 2018169733 A1 | 9/2018 |

OTHER PUBLICATIONS

Haykin, M. and Warnar, R., "Smart Card Technology: New Methods for Computer Access Control", Computer Science and Technology NIST Special Publication 500-157:1-60 (1988).
Lehpamer, H., "Component of the RFID System", RFID Design Principles, 2nd edition pp. 133-201 (2012).
Author Unknown, "CardrefresherSM from American Express®", [online] 2019 [retrieved on Mar. 25, 2019]. Retrieved from Internet URL: https://merchant-channel.americanexpress.com/merchant/en_US/cardrefresher, 2 pages.
Author Unknown, "Add Account Updater to your recurring payment tool", [online] 2018-19 [retrieved on Mar. 25, 2019]. Retrieved from Internet URL: https://www.authorize.net/our-features/account-updater/, 5 pages.
Author Unknown, "Visa® Account Updater for Merchants", [online] 2019 [retrieved on Mar. 25, 2019]. Retrieved from Internet URL: https://USA.visa.com/dam/VCOM/download/merchants/visa-account-updater-product-information-fact-sheet-for-merchants.pdf, 2 pages.
Author Unknown, "Manage the cards that you use with Apple Pay", Apple Support [online] 2019 [retrieved on Mar. 25, 2019]. Retrieved from Internet URL: https://support.apple.com/en-US/HT205583, 5 pages.
Author Unknown, "Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.
Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.
Author Unknown, "NFC Guide: All You Need to Know About Near Field Communication", Square Guide [online] 2018 [retrieved on Nov. 11, 2018]. Retrieved from Internet URL: https://squareup.com/guides/nfc, 8 pages.
Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.
Cozma, N., "Copy data from other devices in Android 5.0 Lollipop setup", CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.
Kevin, Android Enthusiast, "How to copy text string from NFC tag", StackExchange [online] 2013 [retrieved on Mar. 25, 2019]. Retrieved from the Internet URL: https://android.stackexchange.com/questions/55689/how-to-copy-text-string-from-nfc-tag, 11 pages.
Author Unknown, "Tap & Go Device Setup", Samsung [online] date unknown [retrieved on Mar. 25, 2019]. Retrieved from the Internet URL: https://www.samsung.com/US/switch-me/switch-to-the-galaxy-s-5/app/partial/setup-device/tap-go.html, 1 page.
Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.
Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.
Song, et al., " The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.
Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.
Adams, D., and Maier, A-K., "Goldbug Big Seven open source crypto-messengers to be compared—or: Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.
Author Unknown, "Triple DES", Wikipedia [online] 2018 [retrieved on Mar. 25, 2019]. Retrieved from Internet URL: https://simple.wikipedia.org/wiki/Triple_DES, 2 pages.
Song F., and Yun, A.I., "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.
Saxena, N., "Lecture 10: NMAC, HMAC and No. Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.
Berg, G., "Fundamentals of EMV", Smart Card Alliance [online] date unknown [retrieved on Mar. 27, 2019]. Retrieveed from Internet URL: https://www.securetechalliance.org/resources/media/scap13_preconference/02.pdf, 37 pages.
Pierce, K., "Is the amazon echo NFC compatible?", Amazon.com Customer Q&A [online] 2016 [retrieved on Mar. 26, 2019]. Retrieved from Internet URL: https://www.amazon.com/ask/questions/Tx1RJXYSPE6XLJD?_encodi. . . , 2 pages.
Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.
Author Unknown, "Adaptive Authentication", SecureAuth [online] 2019 [retrieved on Mar. 25, 2019]. Retrieved from Internet URL: https://www.secureauth.com/products/access-management/adaptive-authentication, 7 pages.
van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.
Author Unknown, "Autofill", Computer Hope [online] 2018 [retrieved on Mar. 25, 2019]. Retrieved from Internet URL: https://www.computerhope.com/jargon/a/autofill.htm, 2 pages.
Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.
Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-brw1103/mac, 3 pages.

(56) References Cited

OTHER PUBLICATIONS

Menghin, M.J., "Power Optimization Techniques for Near Field Communication Systems", 2014 Dissertation at Technical University of Graz [online]. Retrieved from Internet URL: https://diglib.tugraz.at/download.php?d=576a7b910d2d6&location=browse, 135 pages.

Mareli, M., et al., "Experimental evaluation of NFC reliability between an RFID tag and a smartphone", Conference paper (2013) IEEE Africon At Mauritius [online] [retrieved on Mar. 25, 2019]. Retrieved from Internet URL: https://core.ac.uk/download/pdf/54204839.pdf, 5 pages.

Davison, A., et al., "MonoSLAM: Real-Time Single Camera Slam", IEEE Transactions on Pattern Analysis and Machine Intelligence 29(6): 1052-1067 (2007).

Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.

Author Unknown: "onetappayment™", [online] Jan. 24, 2019, [retrieved on Mar. 25, 2019]. Retrieved from Internet URL: https://www.payubiz.in/onetap, 4 pages.

Vu, et al., "Distinguishing users with capacitive touch communication", Proceedings of the Annual International Conference on Mobile Computing and Networking, 2012, MOBICOM. 10.1145/2348543.2348569.

Pourghomi, P., et al., "A Proposed NFC Payment Application, International Journal of Advanced Computer Science and Applications," 4(8):173-181 (2013).

Author unknown, "EMV Card Personalization Specification", EMVCo., LLC., specification version 1.0, (2003) 81 pages.

Ullmann et al., "On-Card User Authentication for Contactless Smart Cards based on Gesture Recognition", paper presentation LNI proceedings, (2012) 12 pages.

Faraj, S.T., et al., "Investigation of Java Smart Card Technology for Multi-Task Applications", J of Al-Anbar University for Pure Science, 2(1):23 pages (2008).

Dhamdhere, P., "Key Benefits of a Unified Platform for Loyalty, Referral Marketing, and UGC", Annex Cloud [online] May 19, 2017 [retrieved on Jul. 3, 2019]. Retrieved from Internet URL: https://www.annexcloude.com/blog/benefits-unified-platform/, 13 pages.

International Search Report and Written Opinion for International Patent Application No. PCT/US2020/040999 mailed on Nov. 9, 2020, 10 pages.

* cited by examiner

AUTHENTICATING VOICE TRANSACTIONS WITH PAYMENT CARD

BACKGROUND

A smart digital assistant (SDA) is a device that has speakers, microphones, internet access and the capability to recognize and perform tasks in response to voice commands within the vicinity of the smart digital assistant. The SDAs in response to the voice commands may be able to perform different tasks, such as present news items, the current weather, play music, and communicate with friends and family.

However, more and more of interactions with the cloud go through voice-recognition-equipped SDAs, but there is very little authentication. Moreover, most SDAs allow guest access and attempt to distinguish guest's voices from authorized user's voices, but there is no secure authentication that an authorized user provided the commands recognized by the SDA.

It would be helpful if users were able to authenticate themselves to the SDA without having to provide unfettered access to their accounts, say passwords out loud, or similar unwieldy methods of authenticating themselves to the SDA.

SUMMARY

An example of a disclosed method includes providing, in response to receiving via a smart digital device a voice request for a purchase of a requested item, a list of items available for purchase that substantially match the requested item to an output device of the smart digital device. The output device of the smart digital device is at least one of a display or a speaker. The list of items available for purchase is output via the output device. An item to purchase from the list of items available for purchase is selected. Encrypted data from a payment card may be received via a near-field communication interface of the smart digital device. The encrypted data is generated by a cryptographic algorithm that uses an encryption key. The encryption key may be stored in a memory of the payment card and generated based on a master key and a counter value stored in a memory of the payment card. The encrypted data is forwarded in a request to an application server. The request includes a request to confirm the encrypted data is associated with a payment card authorized to purchase the selected item to purchase. A confirmation of a purchase transaction related to the selected item to purchase is authorized may be received. An indication of receipt of the purchase transaction confirmation may be output to the output device.

Another method is disclosed in which a request for an item for purchase is received from a smart digital device. A query may be generated to locate the item for purchase at a number of merchant websites. The query may be sent to the number of merchant websites. In response to the query, a merchant response from each merchant website is received. Each respective merchant website responds with a merchant response that includes a price of the item for purchase offered for sale by the respective merchant website. The merchant responses are consolidated in a consolidated list of items for purchase. The consolidated list is sent to the smart digital device. A confirmation request from the smart digital device is received. The confirmation request may include an item for purchase selected from the consolidated list and an authentication indication including encrypted data generated by the payment card based on a cryptographic algorithm and an encryption key. The encryption key may be generated based on a master key and a counter value stored in a memory of the payment card. Upon successful confirmation of the payment card, a purchase transaction with the respective merchant for the item for purchase selected from the consolidated list is completed.

Also disclosed is a system including a payment card and a purchase application stored on and executable by a smart digital device. The purchase application may include programming code that when executed provides a user interface. The payment card may include a logic circuit, a payment card near-field communication device, and a payment card memory device. The payment card memory device stores a payment card identifier, a master key and a counter value. The purchase application is operable to perform further functions, including functions to receive an item purchase request including an item available to purchase. The purchase application sends the received item purchase request for confirmation and receives a list of merchants offering the item available for purchase. The purchase application presents the list of merchants in a user interface and receives, via the user interface, a selection of at least one of the merchants selling the item available for purchase. A prompt requesting insertion of the payment card into a vicinity of a near-field communication device of the smart digital device is presented via the user interface. A payment card signal containing encrypted data generated by the payment card using a cryptographic algorithm and an encryption key may be received. The encrypted data includes the payment card identifier and the encryption key may be generated based on a master key and a counter value stored in the payment card memory device. A confirmation request including a payment card identifier may be sent for authentication. A purchase transaction confirmation, in response to an authentication, may be received. An indication of receipt of the purchase transaction confirmation may be output via the user interface.

DETAILED DESCRIPTION

Figure 1:
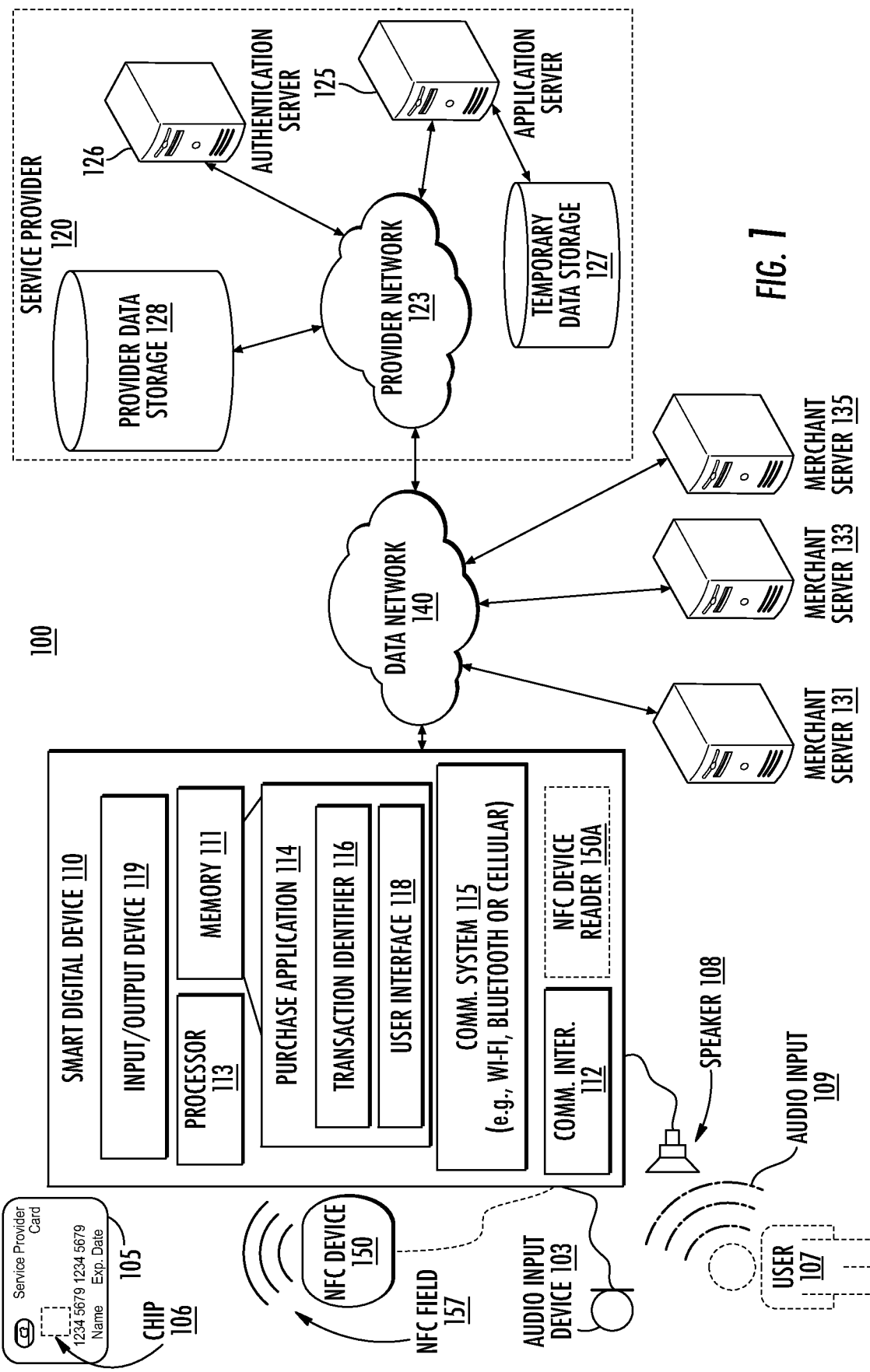
FIG. 1 illustrates an example of an implementation of a system for authenticating voice-based transactions as described herein.

Examples disclosed herein provide authentication techniques and devices to enable authentication of purchase requests made by audio input to a smart digital device. The authenticity of the voice input as an authorized user of a payment card may be verified by inserting a payment card as described herein within range of a near-field communication device coupled to the smart digital device. As a result of the techniques and devices described herein audio input purchase requests are more secure and eliminate a deficiency in prior smart digital assistant devices.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modification, equivalents, and alternatives within the scope of the claims.

FIG. 1 depicts a schematic of a system 100 example, consistent with disclosed examples. The system 100 may include a data network 140, a service provider 120, a smart digital device 110, a payment card 105, and one or more merchant servers 131, 133, and 135.

The payment card 105 may (as shown in more detail with reference to FIGS. 2A and 2B) include a logic circuit, a payment card near-field communication device, and a memory device. In an example, the payment card 105 may lack a persistent power source, such as a battery.

The data network 140 may be operable to exchange data and communications. For example, the data network 140 may be at least one of a cellular network, a wide-area network, the Internet, or a combination of different networks that facilitate the exchange of data and communications among the smart digital device 110, the merchant servers 131, 133 and 135, and the service provider 120.

The service provider 120 may include a provider network 123, an authentication server 126, an application server 125, a temporary data storage 127, and a provider data storage 128. The service provider 120 servers and provider network 123 may be coupled to the smart digital device 110 via the data network 140. The authentication server 126 and the application server 125 may also be coupled to the smart digital device 110 via the data network 140. In a specific example, the service provider 120 may be a financial institution. In other examples, the service provider 120 may be a third-party entity or the like, that maintains a trust relationship or other form of relationship that enables the third-party entity to authenticate the payment card 105 to the smart digital device 110. The temporary data storage 127 may be coupled to the application server 125, and may, for example, be operable to store item purchase requests and other information for a predetermined amount of time or until the occurrence of an event, such as a purchase or transaction cancellation. For example, the application server 125 may be operable to provide instances of a purchase application, such as 114, to smart digital devices, such as 110, that request a copy of the purchase application. An instance of the purchase application, such as 114, may be stored in the provider data storage 128 or another storage device (not shown) of the service provider 120.

The merchant servers 131, 133 and 135 may be provided by merchants or by third-parties on behalf of merchants and may be operable to provide items and services for purchase by users via on-line transactions with devices, such as a smart digital device 110 or other computing devices, such as smartphones, tablets, computers, or the like.

The smart digital device 110 is representative of any type of network-enabled smart digital devices, such as Amazon Alexa®, Google Home®, or the like. The smart digital device 110 includes a smart digital device (SDD) processor 113, an audio input device 103 (such as a microphone), input/output device 119 (such as a touchscreen display, a keyboard, a keypad, non-touch display, buttons, gesture recognition-enabled device, eye direction reader, camera, a combination of devices, or the like), a speaker 108, a smart digital device memory 111 that stores programming code, a communication system 115, a communication interface (Inter.) 112 and a near-field communication device 150/150A. The communication interface 112 may be operable to provide a communication interface for the near-field communication device 150/150A or may include a near-field communication device communication interface.

The audio input device 103 may be, for example, a microphone or other device that enables the conversion of sound, or audio, into electrical signals. For example, the audio input device 103 may be a micro-electro-mechanical transducer device or the like. The speaker 108 may be an audio output device that outputs audio generated by the smart digital device 110, such as music, talk show content, movie audio, synthesized human speech, such as responses to questions posed by users using speech or text input via an input/output device 119 to the smart digital device, prompts for input, questions for additional information or confirmation, or the like.

The communication system 115 may, for example, include different radio frequency and/or optical receivers and/or transmitters under control of the processor 113. For example, the communication system 115 may include a Wi-Fi transceiver (i.e., 802.11x), a Bluetooth transceiver a cellular transceiver or a similar radio frequency transceiver.

In addition, the communication system may include an optical receiver and/or transmitter, such as an infrared (IR) frequency light detector or the like. The communication system 115 may be coupled to one or more antennas (not shown) the enable the receipt and transmission of data by and from the smart digital device 110. The communication system 115 may be coupled to the communication interface 112.

The communication interface 112 may include couplings for connecting devices or supplying power to the smart digital device 110 via a universal serial bus (USB) connector, a micro-USB, or other standard or proprietary connectors.

The near-field communication device 150 may connect to the smart digital device 110 using a wired or wireless connection. For example, the near-field communication device 150 may couple to the communication interface 112 via a wired connection. The communication interface 112 may be coupled to the processor 113 which may determine how to route data or power received via the connection the communication interface 112. Alternatively, if the near-field communication device 150 couples to the smart digital device 110 via a wireless connection the communication system 115 may utilize a Bluetooth transceiver or the like to pair with the near-field communication device 150. Alternatively, the smart digital device 110 may include a near-field communication device, such as 150A, that is incorporated within the smart digital device 110, and that does not require equipment external to the smart digital device, such as 150.

In an example, the smart digital device memory 111 of the smart digital device 110 in addition to storing programming code includes an instance of a purchase application 114. The purchase application 114 may be a computer application that when executed by the processor 113 may be representative of any type of computer application in which a user may provide payment information to complete a transaction. For example, the purchase application 114 may allow users of the smart digital device 110 to select and purchase goods, products, and/or services via the communication system 115. In one embodiment, the purchase application 114 may be a web-based application that is accessed using a web browser (not pictured). For example, in a web-based application, the web browser may access a website of the merchant and/or progressive web applications provided by the merchant.

As shown, the purchase application 114 may utilize a transaction identifier 116. As described in greater detail herein, the purchase application 114 may be software, hardware, and/or a combination of software and hardware that allows users to pay for transactions initiated by a voice input to the smart digital device 110. The transaction identifier 116 may be a unique identifier associated with a given transaction to be performed with a merchant and/or a merchant server, such as 131, 133 or 135 associated with the merchant. For example, the transaction identifier 116 may be a unique alphanumeric identifier, a unique session alphanumeric identifier, a file, or the like. The transaction identifier 116 may be generated by the purchase application 114.

The purchase application 114 may also include programming code that provides a user interface 118. When programming code providing the user interface 118 is executed, the user interface 118 is operable to receive inputs from the input/output device 119 and provide outputs to the input/output device 119. For example, inputs and outputs related to selecting and purchasing goods, products, and/or services may be received by or output from the user interface 118.

In a brief operational example, a user, such as 107 may use the purchase application 114 to select via an audio input (such as 109) or a touch (not shown) to the input/output device 119 one or more items and/or services from a list or menu for purchase. When the user has selected the desired items and/or services, the user may encounter an interface for completing the transaction (e.g., a cart page, a checkout page, etc.) via the purchase application 114. Advantageously, the purchase application 114 may facilitate authentication of the audio input 109 (e.g., payment) using the payment card 105. For example, the purchase application 114 may output a prompt in the display device for completing the authentication of the audio input 109. For example, the prompt, such as an audio prompt, a text prompt presented on a display screen, a vibration, or the like) may instruct the user to either tap the smart digital device 110 with the payment card 105 or move the payment card 105 in close proximity to the smart digital device 110, thereby bringing the payment card 105 sufficiently close to a near-field communication field 157 of the near-field communication device 150/150A of the smart digital device 110 to enable data transfer (e.g., NFC data transfer, Bluetooth data transfer, etc.) between the chip 106 of the payment card 105 and the near-field communication device 150/150A of the smart digital device 110. In some examples, the smart digital device 110 may trigger the near-field communication device 150/150A via an application program interface (API). In one example, the smart digital device 110 triggers the near-field communication device 150/150A via an API call responsive to the user 107 tapping or placing the payment card 105 in close proximity to the near-field communication device 150/150A of the smart digital device 110. In addition, and/or alternatively, the smart digital device 110 may trigger the near-field communication device 150/150A based on periodically polling the near-field communication device 150/150A after receipt of the audio input 109 or after generating the prompt to place the payment card in range of the near-field communication device 150/150A. Additional details and examples are described with reference to FIGS. 3 and 4.

Figure 2A:
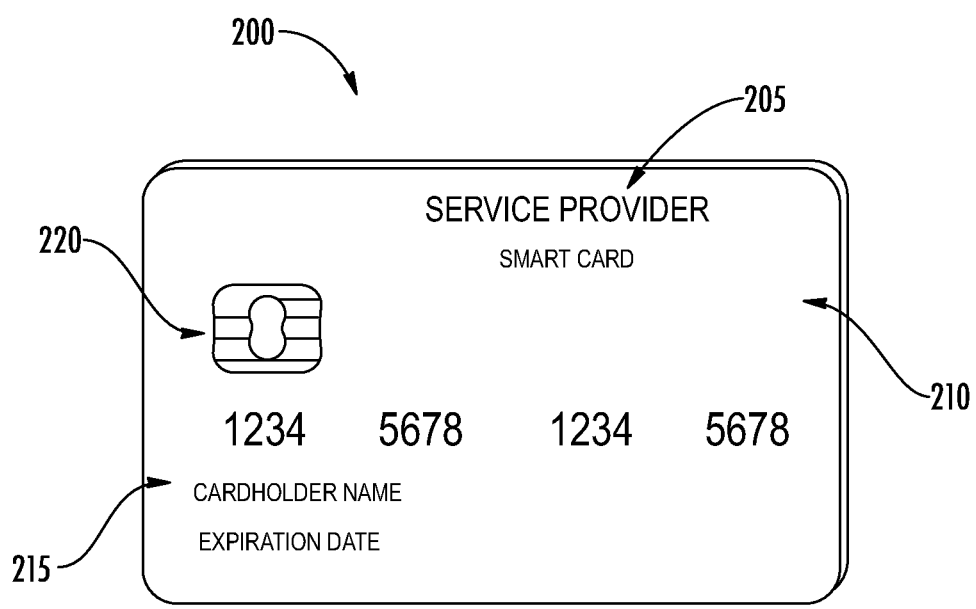
FIG. 2A illustrates a general view of an example payment card having a secured chip suitable for use with the system and processes described herein.
Figure 2B:
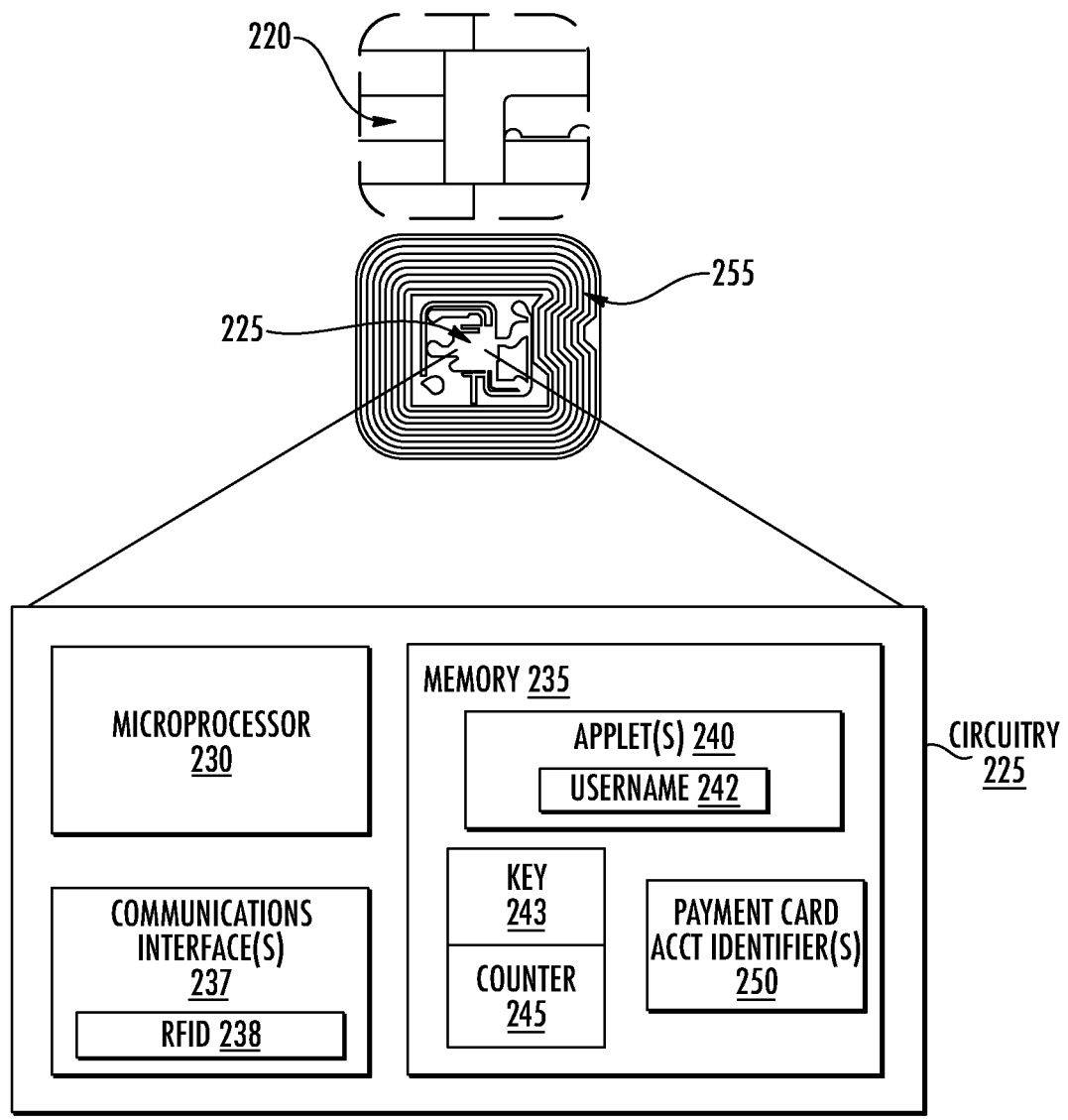
FIG. 2B illustrates a more detailed view of an example of the secured chip of the payment card example of FIG. 2A.

It may be helpful to provide details of the payment card by discussing FIGS. 2A and 2B. In the examples of FIGS. 2A and 2B, the payment card 200 may comprise a dual-interface, contactless payment card. For example, the payment card 200 may comprise a substrate 210, which may include a single layer, or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the payment card 200 may have physical characteristics compliant with the ID-1 format of the ISO/IEC 7810 standard, and the payment card may otherwise be compliant with the ISO/IEC 14443 standard. However, it is understood that the payment card 200 according to the present disclosure may have different characteristics, and the present disclosure does not require a payment card to be implemented in a payment card.

The payment card 200 may also include identification information 215 displayed on the front and/or back of the card that identifiers an authorized user of the payment card 200, a service provider name 205, and a contact pad 220. The contact pad 220 may be configured to establish contact with another communication device, such as a user device, smart phone, laptop, desktop, or tablet computer. The payment card 200 may also include processing circuitry, antenna and other components not shown in FIG. 2A but that are described in more detail with reference to FIG. 2B. These components may be located behind the contact pad 220 or elsewhere on the substrate 210. The payment card 200 may also include a magnetic strip or tape, which may be located on the back of the card (not shown).

As illustrated in FIG. 2B, underneath (and coupled to) the contact pad 220 may be processing circuitry 225 for processing and storing information, including a microprocessor 230 and a memory 235. It is understood that the processing circuitry 225 may, for example, contain additional components, including processors, memories, error and parity/CRC checkers, data encoders, anti-collision algorithms, controllers, command decoders, security primitives, tamper-proofing hardware, or the like as necessary to perform the functions described herein.

The memory 235 may, in an example, be a read-only memory, write-once read-multiple memory or read/write memory, e.g., RAM, ROM, and EEPROM, and the payment card 200 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory 235 is programmed, it may not be rewritten, but it may be read many times.

The memory 235 may be operable to store one or more applet(s) 240, one or more counters 245, and a payment card account identifier 250. The one or more applet(s) 240 may comprise one or more software applications associated with a respective one or more service provider applications (provided, for example, by service provider 120 of FIG. 1) and operable to execute on one or more payment cards, such as a Java Card applet. According to an example, each applet may store a username for a user associated with the payment card account to access the associated service provider application.

The one or more counters 245 may comprise a numeric counter sufficient to store an integer. For example, the payment card 200 may include username 242, an encryption key 243 and counter 245 information that may be transformed by the microprocessor 230 using cryptographic algorithms to generate an encryption key including a dynamic password that may be used by the service provider's authentication server 126 of FIG. 1 to authenticate the transaction via the smart digital device 110. For example, the microprocessor 230 may use the payment card account identifier(s) 250, the encryption key 243, and a value from the counter 245, in cryptographic processing functionality provided by the microprocessor 230 to generate an encryption key including a dynamic password that may be used, together with the username, to authenticate a purchase transaction conducted via the smart digital device 110. Examples of encryption key generation techniques are described in U.S. patent application Ser. No. 16/205,119, filed Nov. 29, 2018, the entire contents of which is incorporated by reference herein in its entirety. In one example, the dynamic password relates to the counter. In such an example, the dynamic password thus advantageously reflects previous behaviors of the holder of the card. For example, the counter-based dynamic password may reflect the number of times that the user has used the payment card to obtain a particular service of the service provider 120, which is a knowledge factor that is virtually impossible for a malicious third party to ascertain. For example, the number of times the payment card is used may be stored as the counter 245 value in a secure memory of the payment card and the counter value may be incremented each time the payment card is used in a transaction.

The payment card account identifier 250 may comprise a unique alphanumeric identifier assigned to a user of the payment card 200 and/or one or more keys that together may be used to distinguish the user of the payment card from other payment card users. In some examples, the payment card account identifier 250 may include information identifying both a customer and an account assigned to that customer and may further identify the payment card associated with the customer's account. According to some aspects, the username 242 may be derived from a combination of the one or more of the payment card account identifier 250 and/or one or more encryption keys 243.

The microprocessor 230 and elements of memory 235 in the foregoing examples are described with reference to the contact pad 220, but the present disclosure is not limited thereto. It is understood that these elements may be implemented outside of the contact pad 220 or entirely separate from it, or as further elements in addition to microprocessor 230 and memory 235 elements located within the contact pad 220.

In some examples, the payment card 200 may comprise one or more antennas 255. The one or more antennas may be placed within the payment card 200 and around the processing circuitry of the contact pad 220. For example, the one or more antennas 255 may be integral with the circuitry 225 and the one or more antennas may be used with an external booster coil. As another example, the one or more antennas may be external to the contact pad 220 and the circuitry 225. The payment card 200 circuitry 225 may include one or more communications interface(s) 237, such as a radio frequency identification (RFID) chip 238, operable to communicate with a smart digital device, such as 110 of FIG. 1, via one or more short-range wireless communication protocols such as near-field communication (NFC), the EMV standard, or the like, and in conformance with ISO/IEC 14443. In some examples, the RFID chip 238 may be referred to as a payment card near-field communication device. Although NFC is used as an example communications protocol, the disclosure is equally applicable to other types of wireless communications, such as the EMV standard, Bluetooth, and/or Wi-Fi.

As explained above, the payment card 200 may be built on a software platform operable on smart cards or other devices that comprises program code, processing capability and memory, such as JavaCard. In some examples, applets may be added to contactless payment cards to generate a one-time password (OTP) for multifactor authentication (MFA) in various mobile application-based use cases. Applet(s) 240 may be configured to respond to one or more requests, such as near-field data exchange (NDEF) requests, from a reader, such as a Near Field Communication (NFC) reader and produce an NDEF message that comprises a cryptographically secure OTP encoded as an NDEF text tag. Thus, the functionality of the contactless payment card is adapted to authenticate a voice purchase request made by a user who is authorized to make the requested purchase and complete the electronic transaction as described below with reference to FIGS. 3 and 4.

Figure 3:
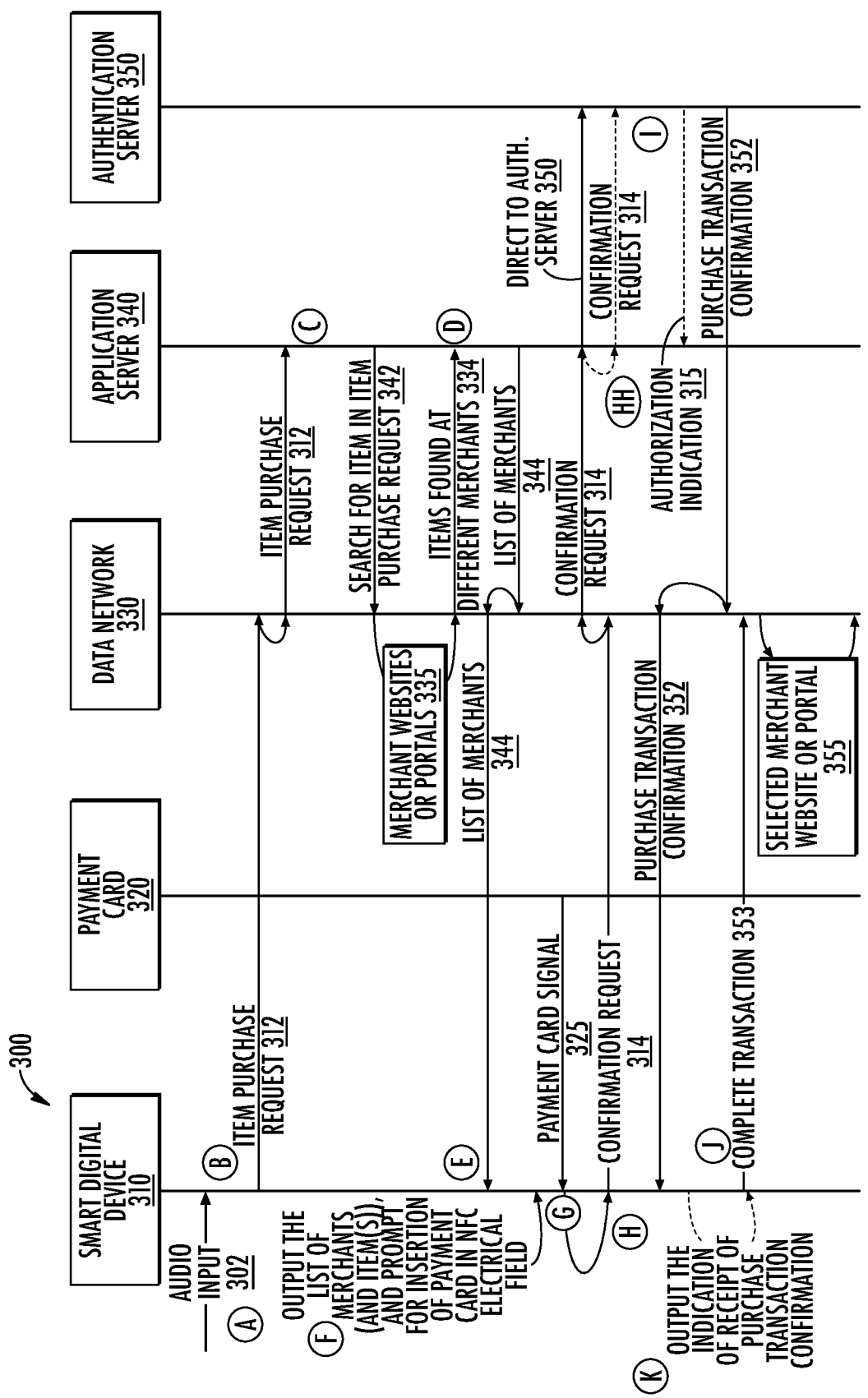
FIG. 3 illustrates an example of data flow for authenticating voice-based transactions in a system, such as the example system illustrated in FIG. 1 and payment card details of FIGS. 2A and 2B.

FIG. 3 illustrates an example of data flow for authenticating voice-based transactions in a system, such as the example system illustrated in FIG. 1.

The exchange of data in data flow of system 300 may be between several devices and/or components such as those described with reference to FIGS. 1, 2A and 2B. Therefore, the discussion of FIG. 3 may reference the devices and components shown in FIGS. 1-2B. In the example of FIG. 3, each of a smart digital device 310, a payment card 320, a data network 330, merchant websites or portals 335, an application server 340 and an authentication server 350 may be coupled to exchange data to facilitate the completion of authorized purchase transactions with merchant websites or portals 335.

For example, the smart digital device 310 includes a smart digital device processor (not shown in this example) that may be similar to smart digital device processor 113 described above with reference to FIG. 1. At A, an audio input 302 may be generated by a user, such as 107 in FIG. 1. The smart digital device processor may receive the audio input 302 via an audio input device of the smart digital device. At B, the audio input 302 may be used to generate an item purchase request that may include an item available to purchase. For example, the user 107 of FIG. 1 may speak the phrase, "Order dog food, 40-pound bag" as an audio input 302 to the smart digital device 310. An audio input device, such as a microphone, receives the audio input 302. The audio input 302 may be processed, for example, using known natural language speech-to-text conversion, natural language processing, or the like. For example, speech recognition systems like Cortana®, Siri®, and Alexa® or other natural language processing applications may provide suitable voice-input conversion for generating the item purchase request 312.

The processor of the smart digital device 310 sends the received item purchase request 312 via the data network 330 to the application server 340. At C, the application server 340 may process the received item purchase request 312 to generate a search query. In a detailed example, in response to receipt of the item purchase request from the smart digital device via the data network, the application server 340 may generate a query to locate the item for purchase at a number of merchant web sites (or merchant portals) 335. The merchant websites or portals 335 may be coupled to the application server via the data network 330. For example, the application server 340 may be operable to accessing merchant websites 335 via the data network 330 and receive results of a search (D) using the generated query for the item included in the item purchase request 342. For example, the application server 340 may receive, in response to the query, a merchant response to the query from a respective merchant server of the number of merchant servers. For example, each respective merchant server may respond with a merchant response that includes a price of the item for purchase offered for sale by the respective merchant server. The merchant websites or portals 335 may return a search result to the application server as items found at different merchants 334. The application server 340, at D, may consolidate the merchant responses by populating a consolidated list of items for purchase, for example, according to a merchant identifier, the payment card identifier in the item purchase request, or the like. The application server 340 send the populated consolidated list of merchants 344 to the smart digital device 310.

At E, the smart digital device 310 may receive via the data network from the application server 340 results showing a number of merchants offering the item available for purchase. In response, the application server 340 may be operable to use the items found at the different merchants' websites or portals to generate in a consolidated list of merchants 344 that are able to provide the item available for purchase. In an example, the list of merchants 344 may include each merchant's price for the item available to purchase. In other examples, the list of merchants 344 may include a merchant name and a price for the item available for purchase from the merchant.

The smart digital device 310 receives the list of merchants 344, at E, from the application server 340. The smart digital device processor may present the list of merchants 344 on a display device of the smart digital device 310 (F). Alternatively, or in addition, the application server 340 may have information related to a mobile device, such as a mobile device telephone number or other information related to the mobile device. Using the information related to the mobile device, the application server may send an SMS message or cause an application, such as an instance of the purchase application 114 executing on the mobile device, to present the list of merchants 344 on a display device of the mobile device (not shown). In an example, the mobile device may couple to the smart digital device, via Bluetooth or Wi-Fi, for example, and provide commands to the smart digital device 310.

In the examples at F, the presented list of merchants 344 may be accompanied with a prompt for a user to insert a payment card to authenticate and approve the purchase transaction. Alternatively, or in addition, in response to the presentation of the list of merchants, the smart digital device processor may receive a selection of at least one of the merchants selling the item available for purchase via a user input either through a voice input received by the microphone or another input device. The received selection indicating that the user desires to complete a purchase transaction for the item available for purchase from the selected merchant. In response to the selection, a prompt requesting insertion of the payment card into the near-field communication device of the smart digital device may be presented on the display device or output as synthesized audio prompt via the speaker. For example, the smart digital device processor may have a number of pre-determined prompts or commands stored in memory that may be output to the display device, the speaker or both.

In response to the prompt, a user may bring the payment card 320 within range of the electric field (for example, by tapping the payment card 320 against or near the smart digital device 310) of an NFC device that is either within or coupled to the smart digital device 310. The payment card 320 may, for example, be tapped against the smart digital device 310 or placed in close enough proximity to the smart digital device 310. In an example, the smart digital device may receive a payment card signal 325 from the payment card. For example, the payment card 320 may detect an electric field and respond by emitting the payment card signal 325 via a payment card near-field communication device (not shown in this example). The payment card signal 325 may include encrypted data or information. The payment card 320 may, for example, in response to the detected electric field, transmit to the smart digital device 310 the payment card signal 325 containing a payment card identifier related to an issuer of the payment card 320 and to an account associated with the payment card 320. The payment card identifier may be encrypted by a cryptographic algorithm executed on the payment card 320. The issuer of the payment card 320 may be the service provider (e.g., service provider 120 of FIG. 1), an entity related to the service provider, or the like.

At G, a payment card signal 325 may be received via the near-field communication device of the smart digital device 310. In an example, the payment card signal 325 may contain encrypted data generated by the payment card using a cryptographic algorithm and an encryption key. The encryption key stored in a memory (not shown in this example) of the payment card 320 may be generated by a logic circuit or processor within the payment card 320, for example, based on a master key and a counter value (obtained for example from counter 245 of FIG. 2B) stored in the memory of the payment card 320. For example, the payment card 320 may be operable to detect an electric field output by the near-field communication device (not shown in this example) of the smart digital device 310. A logic circuit or processor of the payment card 320 may retrieve a payment card identifier from a memory device of the payment card 320. The logic circuit using a cryptographic algorithm, such as SHA-264 or others used in the payment card art, may encrypt the payment card identifier and generate the payment card signal including the encrypted payment card identifier.

A confirmation request 314 may be generated by the payment card 320 processor or logic circuit (H). The confirmation request 314 may include a payment card identifier and a generated encryption key as well as other information, such as encrypted data, if appropriate. For example, the confirmation request 314 may include as other information selections of an item for purchase, a merchant from the consolidated list of merchants, and an authentication indication. The authentication indication may, for example, include a payment card identifier and an indication (such as a bit setting, code value or the like) that the payment card identifier was obtained in response to the payment card being inserted in a near-field communication electrical field associated with the smart digital device 310. In other examples, the encrypted data may be generated by the payment card based on a cryptographic algorithm and a diversified key. For example, the diversified key stored in a memory of the payment card 320 and a logic circuit or processor within the payment card may generate the diversified key based on a master key and a counter value stored in the memory of the payment card 320. The confirmation request 314 may be sent to the authentication server 350 for authentication of the payment card 320.

In an example that may be optional, at HH, instead of the confirmation request 314 being sent directly to the authentication server 350, the confirmation request 314 may be sent to the application server 340. The application server 340 may be operable to process the confirmation request 314. For example, the application server 340 may be operable to extract the encrypted authentication indication from the confirmation request 314 and forward the encrypted authentication indication extracted from the confirmation request 314 to an authentication server 350. The authentication server 350 may process the authentication information and, in response, the authentication server 350 may forward an authorization indication 315 indicating the payment card number is authorized to complete the purchase transaction to the application server 340.

The authentication server 350 is operable to perform various functions including authentication functions. For example, at I, the authentication server 350 is operable to receive the confirmation request 314. In the example, the confirmation request 314 may include an item for purchase selected from the consolidated list of merchants and the authentication indication to confirm the payment card is linked with the item purchase request. Of course, the confirmation request 314 may include additional information, such as an authentication indication, a name of an authorized user of the payment card or the like, an encryption key, or more or less data related to the merchant and the item to be purchased. The authentication indication may include encrypted data generated by the payment card based a cryptographic algorithm and a diversified key, the diversified key stored in a memory of the payment card and generated based on a master key and a counter value stored in a memory of the payment card 320. For example, the authentication indication may be encrypted prior to inclusion in the confirmation request 314.

The smart digital device 310 may receive a purchase transaction confirmation 352 from the authentication server 350. The purchase transaction confirmation 352 indicates the successful confirmation of the payment card 320 using the information in the received confirmation request 314. In response to receipt of the purchase transaction confirmation 352 by the smart digital device 310, the smart digital device 310 upon receipt of the purchase transaction con may be completed (i.e., complete transaction 353) with the respective merchant via the selected merchant website or portal 355 for the item for purchase selected from the consolidated list (J).

In addition, the smart digital device 310 may also, in response to receipt of the purchase transaction confirmation 352 by the smart digital device 310, output an indication of receipt of the purchase transaction confirmation 352 via an output device, such as the display device, the speaker of the smart digital device 310 or both (K).

In another example, a user, such as 107 of FIG. 1, may initiate multiple item purchase requests for different or similar items. The system 300 may, for example, queue the multiple purchase requests for later action by an authorized user of the payment card. Such an example, a user only has to authenticate his purchases once for multiple purchases made a different times throughout a time period (e.g., one hour, a day, a week or the like). A process for managing and acting on the multiple purchase requests is described with reference to FIG. 4.

The process 400 may be performed by a system such as the system 100 shown and described with reference to FIG. 1. For example, in process 400, an application server, such as 125 may perform a number of functions in cooperation with a temporary data storage, such as temporary data storage 127 of FIG. 1.

Figure 4:
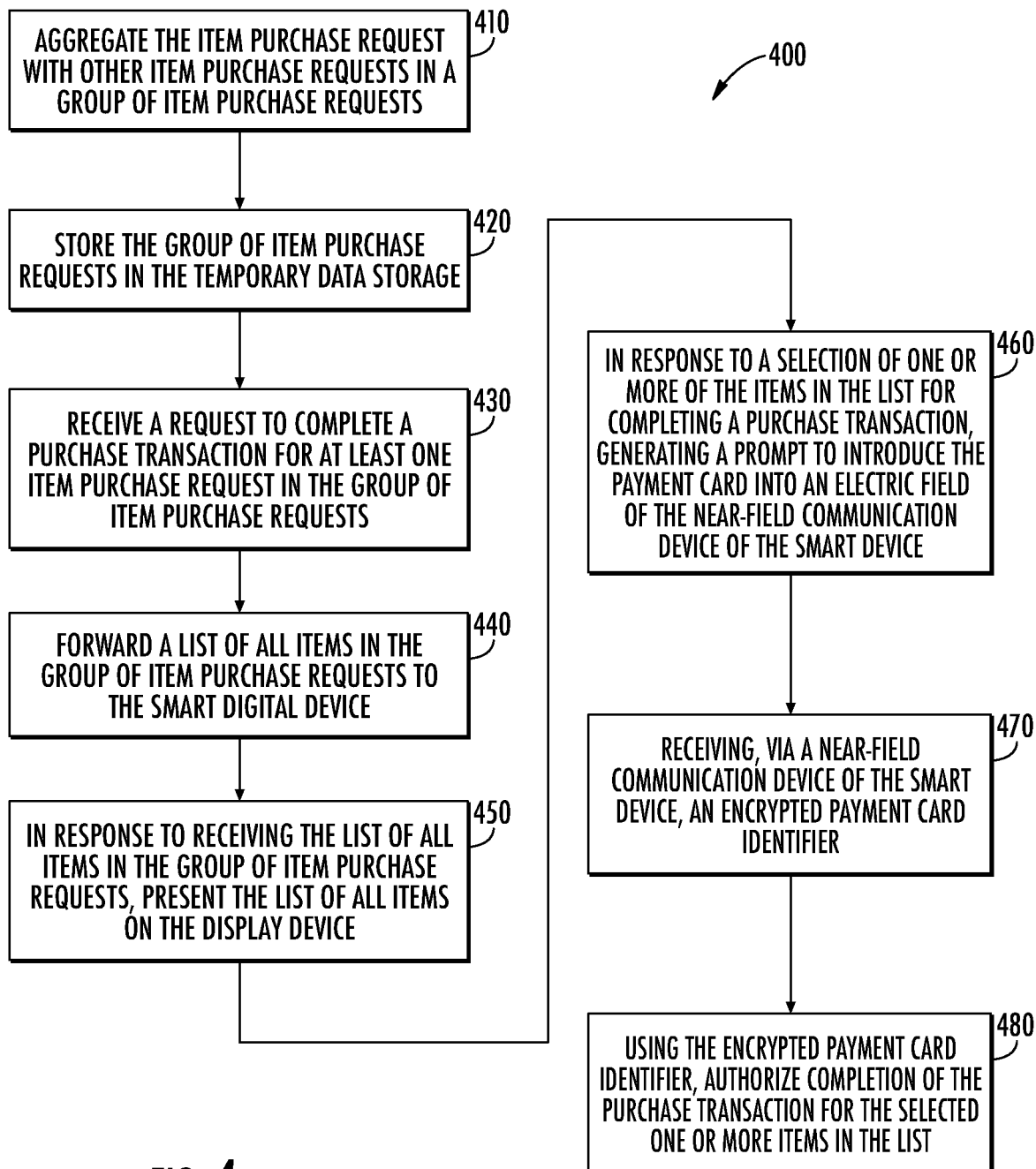
FIG. 4 presents a flow chart for another example of authenticating voice-based transactions in a system, such as the example system illustrated in FIG. 1 and payment card details of FIGS. 2A and 2B.

The application server, such as 125 of FIG. 1 or 340 of FIG. 3, is operable to perform additional functions, such as the process 400 illustrated in FIG. 4. For example, at 410, the application server 340 may be operable to aggregate a received item purchase request with other item purchase requests in a group of item purchase requests. The group of item purchase requests may be stored (420) in the temporary data storage, such as temporary data storage 127 of FIG. 1. In an example in which a group of item purchase requests are received, the application server, such as 125, may forward a list of all items in the group of item purchase requests to the smart digital device, such as 110 of FIG. 1. In response to forwarding the list, the application server may receive from the smart digital device, at 430, a request to complete a purchase transaction for at least one item purchase request in the group of item purchase requests is received by the application server. The request to complete a purchase transaction may, for example, be sent as part of the confirmation request 314 of FIG. 3 or as part of the complete transaction 353 of FIG. 3. At 440, a list of all items in the group of item purchase requests may be forwarded to the smart digital device.

The smart digital device may also perform functions in cooperation with the application server. For example, in response to receiving the list of all items in the group of item purchase requests, the list of all items may be presented on a display device of the smart digital device (450). A smart digital device may receive an input that selects one or more of the items in the list for purchase. In response to a selection of one or more of the items in the list for completing a purchase transaction, a prompt may be generated by the smart digital device to introduce a payment card into an electric field of the near-field communication device of the smart device (460). The smart digital device may receive via the near-field communication device an encrypted payment card identifier when the payment card is introduced into an electric field of the near-field communication device of the smart device (470). Using the encrypted payment card identifier, the smart digital device may request authorization from the application server to complete the purchase transaction for the selected one or more items in the list may be requested at 480.

Figure 5:
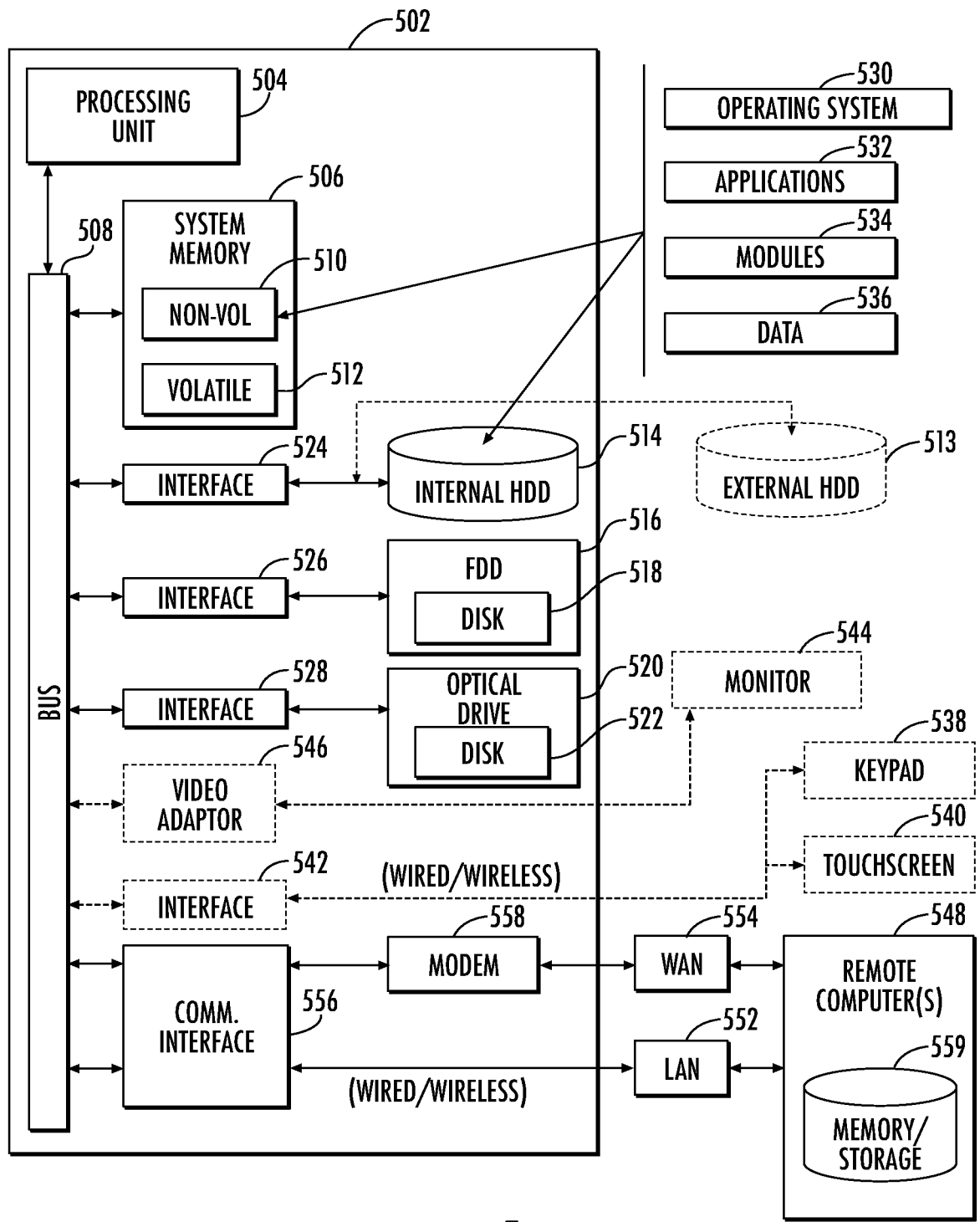
FIG. 5 illustrates an example of a computing architecture suitable for implementing the examples illustrated in FIGS. 1-4.

FIG. 5 illustrates an example of an exemplary computing architecture 500 suitable for implementing various examples as previously described. In one example, the computing architecture 500 may be incorporate elements as may be typically used to implement a server or network platform, if appropriately programmed, as part of system 100. In another example, the computing architecture 500 may be incorporate optional elements that may be typically used to implement a smart digital device or a computing device that may be implemented as part of system 100.

The computing architecture 500 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The examples, however, are not limited to implementation by the computing architecture 500.

As shown in FIG. 5, the computing architecture 500 includes a processing unit 504, a system memory 506 and a system bus 508. The processing unit 504 can be any of various commercially available processors or number of processors.

The system bus 508 provides an interface for system components including, but not limited to, the system memory 506 to the processing unit 504. The system bus 508 can be any of several types of bus structures that may further interconnect to a memory bus (with or without a memory controller), a peripheral bus, and a local bus using any of a variety of commercially available bus architectures. Interface adapters may connect to the system bus 508 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 500 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Examples may also be at least partly implemented as instructions contained in or on a non-transitory computer-readable medium, which may be read and executed by one or more processors to enable performance of the operations described herein.

The system memory 506 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated example shown in FIG. 5, the system memory 506 can include non-volatile memory 510 and/or volatile memory 512. A basic input/output system (BIOS) can be stored in the non-volatile memory 510.

The computer 502 may include various types of computer-readable storage media in the form of one or more lower speed memory units, including an internal hard disk drive (HDD) 514 (or, optionally, external hard disk drive (HDD) 513), a magnetic floppy disk drive (FDD) 516 to read from or write to a removable magnetic disk 518, and an optical disk drive 520 to read from or write to a removable optical disk 522 (e.g., a CD-ROM or DVD). The HDD 514 or 513, FDD 516 and optical disk drive 520 can be connected to the system bus 508 by an HDD interface 524, an FDD interface 526 and an optical drive interface 528, respectively. The HDD interface 524 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of computer program modules can be stored in the drives and memory 510, 512, including an operating system 530, one or more application programs 532, other program modules 534, and program data 536. In one example, the one or more application programs 532, other program modules 534, and program data 536 can include, for example, the various applications and/or components of the computing architecture 500. At least one computer-readable storage medium may include instructions that, when executed, cause a system to perform any of the computer-implemented methods and processes described herein.

Optionally, when configured as a mobile device, a smart digital device, a laptop or the like, the computing architecture 500 may include additional devices to enable data input and output to a user. For example, a user may enter commands and information into the computer 502 through one or more wire/wireless optional input devices, for example, a keypad 538 and a tactile input device, such as a touchscreen 540. Other input devices may include microphones, infrared (IR) remote controls, radio-frequency (RF) remote controls, game pads, stylus pens, near-field communication devices, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 504 through optional interface 542 that is coupled to the system bus 508 but can be connected by other interfaces such as a parallel port, IEEE 1394 serial port, a game port, a USB port, an IR interface, and so forth.

Another optional element may be display 544, which may be an organic light emitting diode (OLED), light emitting display (LED), or other type of display device, that is also connected to the system bus 508 via an interface, such as an optional video adaptor 546. The display 544 may be internal or external to the computer 502. In addition to the display 544, a computer typically includes other peripheral output devices, such as speakers, printers, and so forth which may be coupled to the system bus 508 via the optional interface 542.

The computer 502 may operate in a networked environment using logical connections via wire and/or wireless communications to one or more remote computers, such as a remote computer 548. The remote computer 548 can be a workstation, a server computer, a router, a personal computer, portable computer, microprocessor-based entertainment appliance, a peer device or other common network node, and typically includes many or all the elements described relative to the computer 502, although, for purposes of brevity, only a remote memory/storage device 559 is illustrated. The logical connections depicted include wire/wireless connectivity to a local area network (LAN) 552 and/or larger networks, for example, a wide area network (WAN) 554. Such LAN and WAN networking environments are commonplace in offices and companies, and facilitate enterprise-wide computer networks, such as intranets, all of which may connect to a global communications network, for example, the Internet.

When used in a LAN networking environment, the computer 502 may be connected to the LAN 552 through a wire and/or wireless communication network interface or adaptor 556. The adaptor 556 can facilitate wire and/or wireless communications to the LAN 552, which may also include a wireless access point disposed thereon for communicating with the wireless functionality of the adaptor 556.

When used in a WAN networking environment, the computer 502 can include a modem 558, or is connected to a communications server on the WAN 554 or has other means for establishing communications over the WAN 554, such as by way of the Internet. The modem 558, which can be internal or external and a wire and/or wireless device, connects to the system bus 508 via the interface 542. In a networked environment, program modules depicted relative to the computer 502, or portions thereof, can be stored in the remote memory/storage device 559. It will be appreciated that the network connections shown are exemplary and other means of establishing a communications link between the computers can be used.

The computer 502 is operable to communicate with wired and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions). The wireless technologies may couple to the computer 502 via one or more transceivers (not shown) within for example the interface 542 or communication interface 556 that facilitate the use of the Wi-Fi, WiMax, Bluetooth wireless technologies as well as others.

The various elements of the devices as previously described with reference to FIGS. 1-5 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

As used in this application, the terms "system" and "component" are intended to refer to a computer-related entity, either hardware, a combination of hardware and software, software, or software in execution, examples of which are provided by the exemplary computing architecture 500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further examples, however, may alternatively employ data messages. Such data messages may be sent across various connections. Exemplary connections include parallel interfaces, serial interfaces, and bus interfaces.

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in examples.

Some examples may be described using the expression "one example" or "an example" along with their derivatives. These terms mean that a particular feature, structure, or characteristic described in connection with the example is included in at least one example. The appearances of the phrase "in one example" in various places in the specification are not necessarily all referring to the same example. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A process is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more examples. Rather, the operations are machine operations.

Some examples may be described using the expression "coupled" and "connected" along with their derivatives. These terms are not necessarily intended as synonyms for each other. For example, some examples may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

As used in this application, the terms "system" and "component" are intended to refer to a computer-related entity, either hardware, a combination of hardware and software, software, or software in execution, examples of which are provided by the examples in FIGS. 1-5. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server or processor and the server or processor can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

Various examples also relate to apparatus or systems for performing these operations. This apparatus may be specially constructed for the required purpose and may be selectively activated or reconfigured by a computer program stored in the computer. The procedures presented herein are not inherently related to a particular computer or other apparatus. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, various features are grouped together in a single example for streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications, and variations that fall within the spirit and scope of the appended claims.

What is claimed is:

1. A computer-implemented method, comprising:
receiving, by an input device of a smart digital device, a verbal item purchase request;
authenticating that the verbal item purchase request is from an authorized user by generating, by a purchase application executing on the smart digital device, a prompt to bring a payment card within range of a communication interface of the smart digital;
periodically polling, by the smart digital device after receiving the verbal item purchase request, the communication interface of the smart digital device to obtain encrypted data from the payment card, wherein the encrypted data is obtained in a near-field communication (NFC) exchange with the payment card and is encrypted by the payment card with a pair of diversified encryption keys generated by the payment;
obtaining by the smart digital device from an application server connected thereto, a consolidated list of items available for purchase that meet the verbal item purchase request retrieved from a temporary data storage, wherein the temporary data storage is coupled to an application storage and maintains the consolidated list of items available for purchase for a predetermined amount of time or until an occurrence of an event that includes either a purchase cancellation or a transaction cancellation, wherein the consolidated list of items is consolidated according to a merchant identifier associated with each of the items available for purchase;

outputting, via a display device, the consolidated list of items available for purchase in response to receiving the encrypted data from the payment card;

receiving, at the smart digital device, a selection of an item to purchase from the consolidated list of items available for purchase;

sending, by the smart digital device, the encrypted data to an authentication server of a service provider, the authentication server to authenticate the encrypted data is associated with the payment card by generating a second pair of diversified encryption keys and decrypting the encrypted data, wherein the payment card is authorized to purchase the selected item;

receiving, from the authentication server of the service provider, confirmation that a purchase transaction related to the selected item is authorized;

accessing a smart digital device account associated with the smart digital device to retrieve authorized payment methods associated with the smart digital device account;

determining the payment card is one of the authorized payment methods associated with the smart digital device account; and completing a purchase transaction for the selected item available for purchase based on the selected item being authorized and the payment card being one of the authorized payment methods.

2. The method of claim 1, further comprising:
receive the consolidated list of items available for purchase to the smart digital device for output to the output device of the smart digital device.

3. The method of claim 1, further comprising:
receiving from the payment card a payment card identifier related to an issuer of the payment card;
sending, from the smart digital device, the payment card identifier to the authentication server for the authentication, the authentication server to determine whether to authorize the purchase transaction.

4. The method of claim 1, wherein the selection of the item to purchase is received via at least one of an input to the display device, an input button, or a voice command.

5. A smart digital device, comprising:
an input device;
a memory configured to store instructions; and
a processor configured to execute the instructions, that when executed, cause the processor to:
process a verbal item purchase request received via the input device;
authenticate that the verbal item purchase request is from an authorized user, wherein to authenticate, the processor:
generates a prompt to bring a contactless card within range of a near-field communication (NFC) interface;
performs, via the NFC interface, an NFC exchange with contactless card; and
periodically polls the NFC interface, after generating the prompt, to thereby receive, via the NFC interface during the NFC exchange, encrypted data from the contactless card, wherein the encrypted data is encrypted by the contactless card with a pair of generated keys;

receive, from an application server connected to the smart digital device, a consolidated list of items available for purchase that meet the verbal item purchase request, wherein the consolidated list of items is consolidated according to a merchant identifier associated with each of the items available for purchase;

output, via an output device, the consolidated list of items available for purchase in response to the verbal item purchase request being authenticated;

receive a selection of an item to purchase from the consolidated list of items available for purchase;

send the encrypted data to an authentication server of a service provider, the authentication server to authenticate the encrypted data is associated with the contactless card by generating another pair of generated keys and decrypting the encrypted data;

receive, from the authentication server of the service provider, confirmation that a purchase transaction related to the selected item is authorized;

access a smart digital device account associated with the smart digital device to retrieve authorized payment methods associated with the smart digital device account;

determine the contactless card is one of the authorized payment methods associated with the smart digital device account; and complete a purchase transaction for the selected item available for purchase based on the selected item being authorized and the contactless card being one of the authorized payment methods.

6. The smart digital device of claim 5, wherein the processor is to receive the consolidated list of items available for purchase from a data store.

7. The smart digital device of claim 5, wherein the processor to:
receive from the contactless card an identifier related to an issuer of the contactless card;
send the identifier to the authentication server for the authentication, the authentication server to determine whether to authorize the purchase transaction.

8. The smart digital device of claim 5, wherein the selection of the item to purchase is received via at least one of an input to a touchscreen display, an input button, or a voice command.

9. The smart digital device of claim 5, wherein the output device on which the consolidated list of items available for purchase is output, is a mobile device associated with the smart digital device.

10. The smart digital device of claim 9, wherein the consolidated list of items available for purchase is output to the mobile device via a message transmitted to a number associated with the mobile device.

11. The smart digital device of claim 10, wherein the message transmitted to the number associated with the mobile device comprises a link, which when selected causes the consolidated list of items available for purchase to be displayed on the mobile device.

12. The smart digital device of claim 5, wherein the output device on which the consolidated list of items available for purchase is output is a display device of the smart digital device.

13. The method of claim 1, wherein the display device on which the consolidated list of items available for purchase are output, is a mobile device distinct from the smart digital device.

14. The method of claim 13, wherein outputting the consolidated list of items available for purchase are output to the mobile device comprises sending a link in a message to a phone number associated with the mobile device.

* * * * *